H. B. KIMMEL.
SAW.
APPLICATION FILED OCT 12, 1921.

1,412,618. Patented Apr. 11, 1922.

INVENTOR.
Harry B. Kimmel.
BY Stuart C. Barnes
ATTORNEY.

UNITED STATES PATENT OFFICE.

HARRY B. KIMMEL, OF HIGHLAND PARK, MICHIGAN.

SAW.

1,412,618.   Specification of Letters Patent.   Patented Apr. 11, 1922.

Application filed October 12, 1921. Serial No. 507,181.

*To all whom it may concern:*

Be it known that I, HARRY B. KIMMEL, a citizen of the United States, residing at Highland Park, in the county of Wayne and State of Michigan, have invented certain new and useful Improvements in Saws, of which the following is a specification.

This invention relates to hack saws or any other form of saw which is of such a character that it makes possible the use of the spacing devices to be described. It is the object of the invention to provide adjustable spacing devices that may be applied to a hack saw or a similar tool and which can be adjusted to bend the saw blade to enable it to do work that would not otherwise be possible.

It is often desirable to saw off some article, such as a nail or bolt head, which lies closely against a plain surface. With an ordinary hack saw one cannot get to this work, the handle is in substantially the same plane as the blade, and consequently will keep the blade so spaced from the work that the work cannot be reached. It is the object of the present invention to convert a hack saw or similar tool into an instrument adapted to accomplish this work.

In the drawings,—

*a* designates the hack saw frame or yoke which is provided with the usual handle *b* having a stem *c* on which is a stud *d* over the end of which hooks the saw blade *e*. At the opposite end of the frame is a stem *f* provided with a stud *g* over which hooks the opposite end of the saw blade *e*. This stem *f* has its outer end threaded as at *h* and the wing nut *i* screws onto the threads for tightening up the hack saw blade and carrying it under the usual overhang or back tilting of the studs so as to hold it in place. This is ordinary hack saw construction and no claim is made to so much of the structure.

It will be obvious that with a nail head, screw head, bolt head or anything which is directly against a flat surface, it is impossible to saw this off with an ordinary hack saw because the handle *b* will not enable the blade to be brought against the work. I provide a pair of struts *j* each made in three sections. The upper section comprises a two-part clamp made of members *k* and *m* which can be clamped together by the wing screws *n* and *o*. The inner end of these two clamping members is formed into a threaded socket to receive the bolt *p*. The head of this bolt is a "hex" or four-sided head.

The same form of clamp *q* is used at the ends of the hack saw frame or yoke but these clamps instead of being provided with a headed bolt are provided each with an eye bolt *r*. These act as guides for the struts *j* which are passed through the eyes of the eye bolt and consequently the struts *j* are prevented from slipping along the frame and the blade due to the stresses brought about by the distortion of the saw blade.

Figure 1:
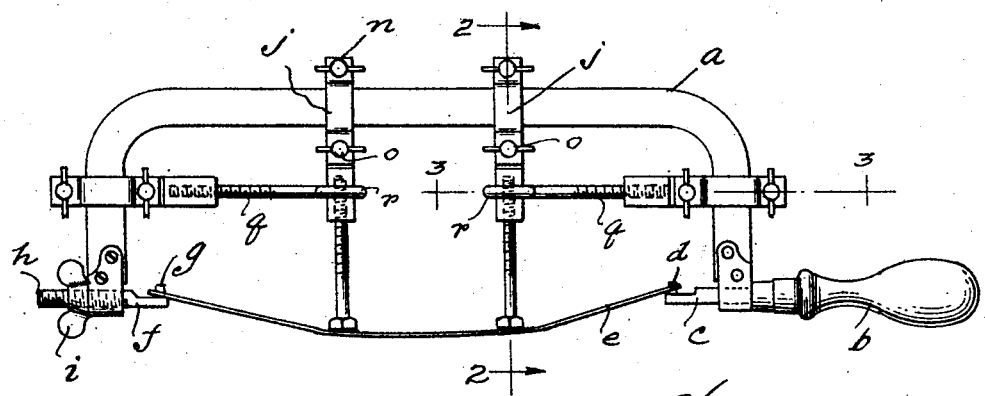
Fig. 1 is a side elevation of a hack saw equipped with my spacing struts.
Figures 2, 3:
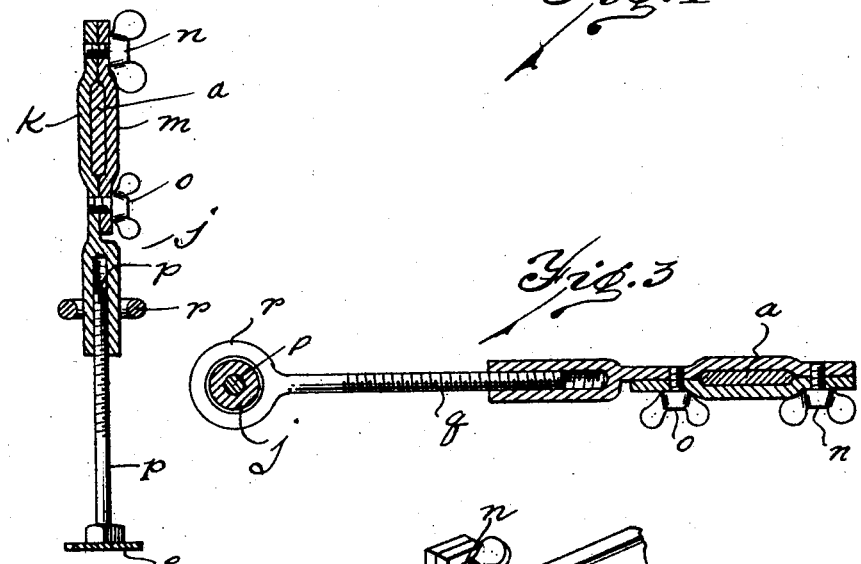
Fig. 2 is a section on the line 2—2 of Fig. 1.
Fig. 3 is a section on the line 3—3 of Fig. 1.
Figure 4:
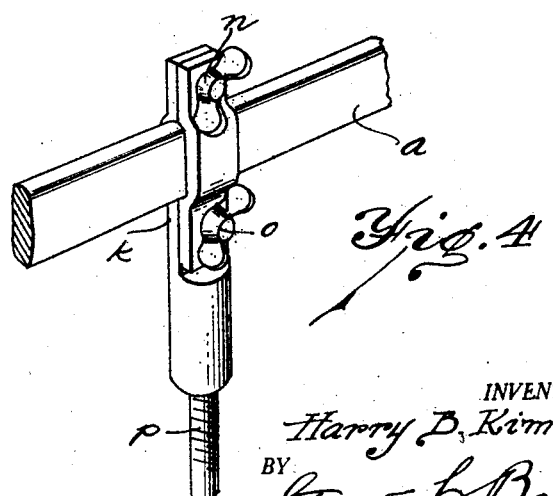
Fig. 4 is a fragmentary perspective showing how the strut clamps onto the hack saw frame.

Obviously when the bolts *p* are turned down the saw blade *e* will be bowed out as clearly shown in Fig. 1. Of course, by loosening the wing nut *i* on the blade adjustment more looseness may be given the saw blade to more sharply bow the same at the center. It will be obvious that the spacing struts *j* and the threaded stem *h* cooperate to make possible more or less bowing of this saw blade depending upon the nature of the work and its accessibility. These spacing struts can be used on almost any form of hack saw and are adaptable, with slight modification, to other forms of saws having frames and flexible blades.

What I claim is:

1. The combination with a saw provided with a flexible saw blade and a yoke-like frame supporting the blade at its ends, of spacing struts for engaging an intermediate portion of the blade for bowing out the same, for the purpose specified.

2. The combination with a saw provided with a flexible blade and a yoke-like frame for supporting the blade at its ends, of adjustable means for engaging an intermediate portion of the blade for bowing out the same, for the purpose specified.

3. The combination with a saw blade and yoke-like frame for supporting the blade at its ends and means for tightening or loosening the saw blade, of adjustable means for engaging an intermediate portion of the blade for bowing out the same, for the purpose specified.

4. The combination with a flexible saw blade and a yoke-like frame for supporting the blade at its ends, of spacing struts for engaging an intermediate portion of the blade for bowing out the same, and guides for the struts, for the purpose specified.

5. The combination with a saw provided with a yoke-like frame and a flexible saw blade supported at its ends on said frame, of adjustable spacing struts for engaging the frame and an intermediate portion of the blade for bowing out the same, for the purpose specified.

6. The combination with a saw provided with a yoke-like frame and a flexible blade supported at its ends in said frame, of spacing struts for engaging an intermediate portion of said blade for bowing out the same, and means for preventing the said spacing struts from moving from the position in which they are set.

7. The combination with a saw provided with a yoke-like frame and flexible saw blade supported at its ends on said frame, of spacing struts for engaging the frame and forcing an intermediate portion of the saw blade outward, and clamps secured to the end of the yoke frame for holding the struts in a given set position.

8. The combination with a saw provided with a yoke frame and flexible blade supported at its ends on said frame, of spacing struts for engaging against the frame and forcing an intermediate portion of the saw blade outward, and adjustable clamps for engaging the end of the yoke frame and holding the spacing struts in any given position along the blade.

9. The combination with a saw provided with a yoke frame and a flexible saw blade supported at its ends on said frame, of spacing struts comprising a pair of strips adapted to be clamped over the frame of the saw and provided with an extension adapted to contact with an intermediate portion of the flexible blade to bow the same out, for the purpose specified.

10. The combination with a saw provided with a yoke frame and a flexible blade supported at its ends on said frame, of a strut for engaging an intermediate portion of said blade and comprising a pair of clamping members, means for clamping the members together over the frame, and a bolt screwing into the members forming an adjustable stem to abut against the flexible blade, for the purpose specified.

11. The combination with a saw provided with a yoke frame and a flexible blade supported at its ends on said frame, of one or more struts adapted to engage the frame and an intermediate portion of said flexible blade for bowing the same, and means for preventing the said strut from sliding along the frame and blade, comprising a clamping member adapted to engage the end of the yoke, and an eye bolt adapted to engage in the clamping member adjustably and through the eye of which is adapted to pass the spacing strut.

In testimony whereof I affix my signature.

HARRY B. KIMMEL.